(12) United States Patent
Welch

(10) Patent No.: US 7,434,348 B1
(45) Date of Patent: Oct. 14, 2008

(54) FISHING POLE STRIKE ALERT

(76) Inventor: Michael Welch, 933 Merryman Dr., Klamath Falls, OR (US) 97603

( * ) Notice: Subject to any disclaimer, the term of this patent is extended or adjusted under 35 U.S.C. 154(b) by 39 days.

(21) Appl. No.: 11/480,158

(22) Filed: Jun. 30, 2006

(51) Int. Cl.
*A01K 97/10* (2006.01)
*A01K 97/12* (2006.01)

(52) U.S. Cl. .......................................... 43/17; 43/21.2
(58) Field of Classification Search .................... 43/15, 43/16, 17, 21.2
See application file for complete search history.

(56) References Cited

U.S. PATENT DOCUMENTS

| | | | | |
|---|---|---|---|---|
| 417,997 | A | | 12/1889 | Dupuis |
| 1,267,248 | A | * | 5/1918 | Monighan ...................... 43/17 |
| 1,987,842 | A | | 1/1935 | Sampson |
| 2,817,176 | A | * | 12/1957 | Harshbarger .................. 43/17 |
| 2,917,858 | A | * | 12/1959 | Ikeuchi ......................... 43/17 |
| 2,944,361 | A | * | 7/1960 | Coulter ......................... 43/16 |
| 3,359,672 | A | * | 12/1967 | Schwartz et al. .............. 43/17 |
| 3,550,302 | A | | 12/1970 | Creviston et al. |
| 3,555,716 | A | * | 1/1971 | Long et al. .................... 43/17 |
| 3,645,028 | A | * | 2/1972 | Rayburn ....................... 43/17 |
| 3,646,697 | A | | 3/1972 | Jennings |
| 3,713,131 | A | * | 1/1973 | Marshall ....................... 43/17 |
| 3,835,568 | A | | 9/1974 | Whitfield |
| 3,888,034 | A | * | 6/1975 | McGuire ....................... 43/17 |
| 4,202,125 | A | * | 5/1980 | Kovacs ......................... 43/17 |
| 4,541,195 | A | * | 9/1985 | Delaney ........................ 43/17 |
| 4,677,784 | A | | 7/1987 | Butkins |
| 4,807,384 | A | | 2/1989 | Roberts, Sr. |
| 5,259,153 | A | * | 11/1993 | Olive et al. ................... 43/113 |
| 5,355,610 | A | * | 10/1994 | Sizemore et al. .............. 43/17 |
| 5,881,488 | A | | 3/1999 | Canepa |
| 6,293,043 | B1 | | 9/2001 | Zwettler |
| 6,568,121 | B1 | * | 5/2003 | Gonzales ...................... 43/17 |
| 6,938,367 | B2 | | 9/2005 | Cameron et al. |

FOREIGN PATENT DOCUMENTS

GB     2086701     *   5/1982

* cited by examiner

*Primary Examiner*—David J Parsley
(74) *Attorney, Agent, or Firm*—Michael I. Kroll

(57) ABSTRACT

A fishing pole strike alert device having an anchor pivotally connected to a rod holder with spring tensioned members positioned between the anchor and the rod holder. The tensioning members vary the angular displacement of the rod holder and anchor, which is used in an electrical alarm circuit with alarm contacts actuatable through the angular displacement between the anchor and rod holder with one of the contacts user selectively positionable to vary the pressure required to actuate the alarm circuit. The electrical circuit uses a self-contained DC power source, preferably a battery. The present invention also provides a fishing strike pole alert device wherein the anchor is a stake decreasing diametrically to a point whereby the anchor can be inserted into the ground.

10 Claims, 13 Drawing Sheets

FISHING POLE STRIKE ALERT

BACKGROUND OF THE INVENTION

1. Field of the Invention

Figure 1:
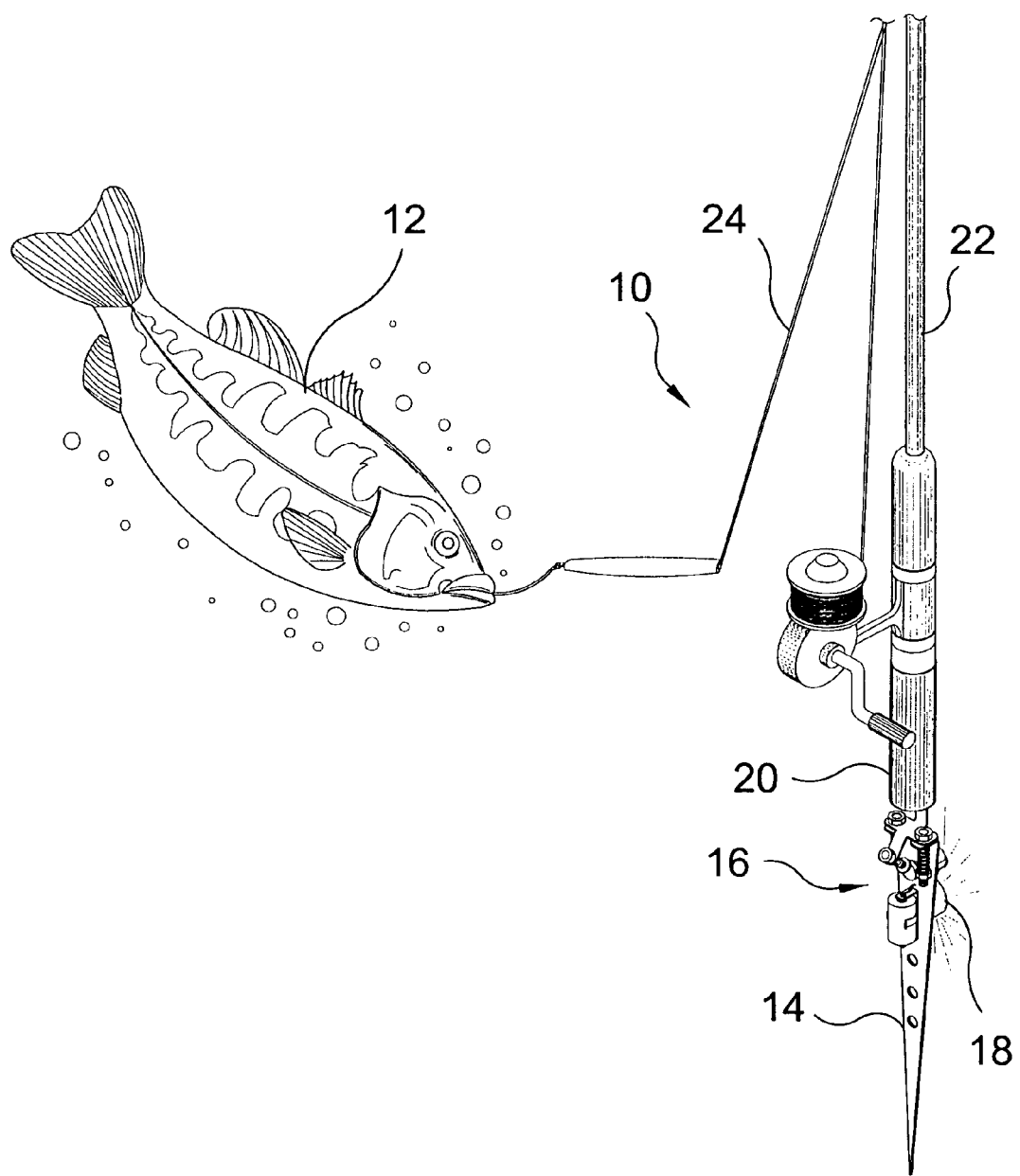

The present invention relates generally to alarm devices and, more specifically, to a fishing pole strike alert device having an anchor pivotally connected to a rod holder with spring tensioned members positioned between the anchor and the rod holder. The tensioning members provide means for varying the angular displacement of the rod holder and anchor, which is used in an electrical alarm circuit with alarm contacts actuatable through the angular displacement between the anchor and rod holder with one of said contacts user selectively positionable to vary the pressure required to actuate said alarm circuit. The electrical circuit uses a self-contained DC power source, preferably a battery. The present invention also provides a fishing pole strike alert device wherein said anchor is a stake decreasing diametrically to a point whereby said anchor can be inserted into the ground.

The anchor can be of a varying length and form that include stake or stave like embodiments serving as ground engaging members and can have a plurality of holes whereby the anchor can alternately be fastened to structure using other user provided fastening means, such as a clamp.

The rod holder forms a housing for the butt of a fishing pole with the housing exterior surface usable as structure for fastening thereto one or more solar cells for charging the DC power source with the solar cells in sheet form pivotally fastened to the housing.

Additionally, a sleeve can be provided for placement over the anchor member whereby the sheathed anchor member can be inserted into existing boat rod holders.

Furthermore, the present invention provides that the alarm circuit includes an additional element wherein the circuit strike indicator, shown as an audible device, can be detachable horn, strobe light or recitation of recorded message.

2. Description of the Prior Art

There are other alarm devices designed for strike alert. Typical of these is U.S. Pat. No. 417,997 issued to Dupuis on Dec. 24, 1889.

Another patent was issued to Sampson on Jan. 15, 1935 as U.S. Pat. No. 1,987,842. Yet another U.S. Pat. No. 2,944,361 was issued to Coulter on Jul. 12, 1960 and still yet another was issued on Dec. 29, 1970 to Creviston, et al. as U.S. Pat. No. 3,550,302 Dec. 29, 1970.

Another patent was issued to Jennings on Mar. 7, 1972 as U.S. Pat. No. 3,646,697. Yet another U.S. Pat. No. 3,835,568 was issued to Whitfield on Sep. 17, 1974. Another was issued to McGuire on Jun. 10, 1975 as U.S. Pat. No. 3,888,034 and still yet another was issued on Jul. 7, 1987 to Butkus as U.S. Pat. No. 4,677,784.

Another patent was issued to Roberts, Sr. on Feb. 28, 1989 as U.S. Pat. No. 4,807,384. Yet another U.S. Pat. No. 5,881,488 was issued to Canepa on Mar. 16, 1999. Another was issued to Zwettler on Sep. 25, 2001 as U.S. Pat. No. 6,293,043 and still yet another was issued on Sep. 6, 2005 to Cameron, et al. as U.S. Pat. No. 6,938,367.

U.S. Pat. No. 417,997

Inventor: Simeon Dupuis

Issued: Dec. 24, 1889

In a rod-holding attachment, the clamp s', composed of the rectangular arm 9, having the orifices o o in two of its opposite sides, and orifices o' o' in the other two sides, the bent arm 10, formed on said rectangular arm and provided with another orifice o', the clamping-screw 12, working in the arm 10 and arranged to co-operate with one side of the rectangular arm 9, the standard-holding screws v v', engaged, respectively, with the arm 9 and the bent arm 10, combined with the standard b and the rod-supporting yoke on said standard, the arrangement being such that the standard may be held by the orifices o o and screw v when the clamp is in one position, and by the orifices o' o' and screw v' when the clamp is in another position, as set forth.

U.S. Pat. No. 1,987,842

Inventor: Willie J. Sampson

Issued: Jan. 15, 1935

A clamp for a fishing pole including two clamping members, one of them providing a shank, one end portion of the shank being outwardly bent at an angle to the shank and then extending approximately parallel to the shank and then being inwardly extended and formed with teeth, the second clamping member co-acting with the first clamping member and having inwardly bent portions at its ends, one of these inwardly bent portions having teeth and confronting the inwardly bent portion on the other member, the other inwardly extending portion of the second named clamping member being concavely curved to partially embrace the shank, and a bolt passing loosely through both of said clamping members, having a head at one end and having a nut at the other end.

U.S. Pat. No. 2,944,361

Inventor: Thomas W. Coulter

Issued: Jul. 12, 1960

In a holder for supporting a fishing rod and swinging the fishing rod when the outer end of the rod is pulled by a fish, a frame having vertically extending and horizontally spaced leg portions, each of said leg portions having an aperture therethrough and a rectangular shaped slot therethrough communicating with the upper portion of the aperture, the aperture and slot in each leg portion being aligned with the aperture and slot in the other leg portion, a shaft journaled in said apertures, said shaft having a substantially square cross section and being of a cross sectional size to slidingly fit in said slots and be held against turning movement by the edges of said slots when extended through said slots, a tube rigidly secured to the shaft between said leg portions and extended at a right angle to the axis of the shaft, said tube being of a size to receive the handle end of the fishing rod in one end thereof and support the, fishing rod substantially in alignment with the tube, and a tension spring anchored to the opposite end of the tube and to the frame below said apertures to continually urge said one end of the tube upwardly.

U.S. Pat. No. 3,550,302

Inventor: Leo J. Creviston, et al.

Issued: Dec. 29, 1970

A fishing apparatus having a fixedly mounted fishing pole and a reel mounted thereon comprising, an elongated lever having guide means releasably engaging a line extending from the reel, means associated with said lever for periodically jerking said line, sensing means rendered operative by release of the line from the guide means in response to a fish bite, and alarm means actuated by said sensing means when detecting a fish bite, said means for periodically jerking the line comprising a rotating cam actuator mounted within a housing, means pivotally mounting said lever within the housing and a cam surface on the lever periodically contacted by said actuator, said lever being oscillated in response to the urging of said actuator, motor means, coupling means connecting said motor means to said cam actuator causing the latter to rotate, first and second voltage sources, means for normally connecting said first voltage source to the input of said motor, automatically actuatable switch means for connecting said second voltage source to the input of said motor for increasing the load capability of said motor during movement of the lever, actuation of said automatically actuated switch means occurring only during contact between said cam actuator and said cam surface.

U.S. Pat. No. 3,646,697

Inventor: George H. Jennings

Issued: Mar. 7, 1972

A fishing accessory includes an outer tubular body pivotally mounting an inner spring biased tubular socket having an open upper end projecting through an open upper end of the body to receive the handle of the fishing rod in a manner such that a tug on the fishing line tends to rotate the socket from its normal position against the spring bias on the socket. The body contains an electrical signalling circuit for signalling this rotation of the socket from normal position to alert the fisherman of a fish bite. The disclosed inventive embodiment has a ground stake removably attached to the body for supporting the latter in a generally upright fishing position.

U.S. Pat. No. 3,835,568

Inventor: Willie C. Whitfield

Issued: Sep. 17, 1974

A fishing rod and reel assembly holder having means for signalling a stroke. The holder includes an upright support and an alarm box carried by the top of the upright support. Clamping means are carried by the top of the alarm box and a pair of opposed forward and reward U-shaped members, the legs of both of which are adjustably held by the clamping means, provide a rod and reel assembly support. Lever actuated switch means is mounted within the box with the lever thereof positioned through the top of the box so that the fishing line may pass from the reel around the lever and then through the eyelets on the rod and into the water. The slightest pull on the fishing line of a supported fishing rod and reel assembly by a striking fish triggers the lever, actuates the switch and initiates the alarm.

U.S. Pat. No. 3,888,034

Inventor: Kenneth H. Mcguire

Issued: Jun. 10, 1975

An adjustable fishing pole holder or tender that includes a sounding device such as a horn as well as a light unit so that when a fish strikes the line the sounding device will be actuated, and wherein the light can be used to indicate that the fish has engaged the hook as during night fishing. The holder comprises a stake for insertion in the ground, a tubular support hingedly secured to the stake for receiving a fishing pole, and a control unit mounted on the support including a pair of mercury switches within the control unit. The switches are connected in circuit to the sounding device and light and when the switches are tipped the circuit is closed to actuate the sounding device and light.

U.S. Pat. No. 4,677,784

Inventor: Joseph S. Butkus

Issued: Jul. 7, 1987

A fishing rod holder includes a tubular member adapted to be pushed into the ground adjacent to a fishing area. The tubular member carries an adjustable ring which can support a fishing rod at selected levels and it also carries an alarm for detecting when a fish moves the fishing rod. This alarm includes a half-ring which is held in a slot in the wall of the tubular member and is spring biased away from an alarm but when a fish moves the rod, the half-ring is pushed into position in which it trips the alarm.

U.S. Pat. No. 4,807,384

Inventor: Joseph M. Roberts

Issued: Feb. 28, 1989

A fishing-rod holder having dual actuation whereby the pivoting of the fishing-rod holder due to the pull of a fish or due to the release of a fishing line from a weight will actuate an alarm. The fishing-rod holder includes a holster portion for receiving and holding a rod, a first mount member supportably attached to the holster portion, and a second mount member for engaging a fixed support such as the railing of a fishing boat. The first mount member includes a housing for pivotally receiving the second mount member, a tension-adjustment spring for the pivoting of the first mount member on the second mount member, and jacks mounted in the housing and including switches actuated by the pivoting of the first member on the second member. An external alarm device can be provided in the captain's cabin for indicating which of a plurality of fishing-rod holders has indicated the strike of a fish.

U.S. Pat. No. 5,881,488

Inventor: Michael J. Canepa

Issued: Mar. 16, 1999

A fish bite detector assembly for attachment to a fishing pole. The assembly includes a battery powered electrical system to signal a fish bite activated by a magnetically controlled switch. The switch is normally open when in close proximity to a magnet. A compression clip operably connected to the magnet, grasps the fishing line forming an integral link between the magnet and the fish hook. A bite or disturbance of the hook causes the magnet to move away from the switch, thus, closing the switch contacts, energizing the electrical system, and activating an audible alarm.

U.S. Pat. No. 6,293,043

Inventor: Ernst Zwettler

Issued: Sep. 25, 2001

Fish strike alarm and fishing rod holder (10) comprises sleeve (16) for receiving handle (101) of fishing rod (100), housing (20), electrical alarm circuit (60) mounted to housing (20) for sounding an audible alarm when closed, and trigger (40). Trigger (40), adapted to close alarm circuit (60) in response to tension in fishing line (104), is both pivotal between an open position and a closed position and reciprocally slidable between a temporary-alarm setting and a continuous-alarm setting. In the temporary-alarm setting, tension in line (104) causes trigger (40) to move to the closed position, line (104) is released, and trigger (40) returns to the open position. In the continuous-alarm setting, tension in line (104) causes trigger (40) to move to the closed position, the line is released, and trigger (40) remains in the closed position. Support stake (12) supports alarm (10) such that rod (100) is supported in an operable position. The portion of line (104) used to activate trigger (40) is fed back to trigger (40) from first guide (102F) on rod (100) above reel (103).

U.S. Pat. No. 6,938,367

Inventor: Michael James Cameron

Issued: Sep. 6, 2005

A battery powered fishing line bite detector alarm producing visible and/or audible alarm signals is disclosed. An arm, installed within the alarm, integrally connects to a modified leaf on-off switch. The alarm attaches to a fishing rod in front of a fishing reel mounted on the rod. Fishing line is threaded into the arm and adjusted such that slack is provided between the rear of the alarm and the front of the reel thereby allowing forward arm movement. The fishing line is further inserted until desired resistance of forward and backward line movement within the arm is achieved. Applied tension to the line forces the arm to actuate. A tension spring clip connected to a switch lever, and a common leaf contact arm, pulls contact arm closer to an upper common contact point until contact is made activating the alarm signals. Increased tensioning pulls the line through a variable sized slit and into a line hole, releasing tension on the arm and causing the contact arm and contact point to break contact, while allowing the arm to return to a self-adjusting alarm casing position.

While these alert devices may be suitable for the purposes for which they were designed, they would not be as suitable for the purposes of the present invention, as hereinafter described.

SUMMARY OF THE PRESENT INVENTION

A primary object of the present invention is to provide a fishing pole strike alert device.

Another object of the present invention is to provide fishing pole strike alert device having an anchor pivotally connected to a rod holder.

Yet another object of the present invention is to provide a fishing pole strike alert device having spring tensioned members positioned between the anchor and said rod holder.

Still yet another object of the present invention is to provide a fishing pole strike alert device wherein said tensioning members provide means for varying the angular displacement of the rod holder and anchor.

A further object of the present invention is to provide a fishing pole strike alert device wherein the actuation of the strike indicator is variable depending on weight of reel, wind and current.

Another object of the present invention is to provide a fishing pole strike alert device having an electrical alarm circuit with alarm contacts actuatable through angular displacement between the anchor and rod holder.

An additional object of the present invention is to provide a fishing pole strike alert device electrical circuit having detachable indicator devices, such as horn, strobe light and recorded message.

Yet another object of the present invention is to provide a fishing pole strike alert device wherein one of said contacts is user selectively positionable to vary the pressure required to actuate said alarm circuit.

Still yet another object of the present invention is to provide a fishing pole strike alert device wherein said electrical circuit uses a self-contained DC power source.

Another object of the present invention is to provide a fishing pole strike alert device wherein said DC power source is a battery.

Yet another object of the present invention is to provide a fishing strike pole alert device wherein said anchor is a stake decreasing diametrically to a point whereby said anchor can be inserted into the ground.

Still yet another object of the present invention is to provide a fishing pole strike alert device wherein said anchor has a plurality of holes whereby said device can alternately be fastened to structure using user provided fastening means.

Another object of the present invention is to provide a fishing pole strike alert device wherein said rod holder forms a housing for the butt of a fishing pole.

Yet another object of the present invention is to provide a fishing pole strike alert device wherein said rod holder housing exterior surface can be used as a structure for fastening thereto one or more solar cells for charging said DC power source.

Still yet another object of the present invention is to provide a fishing pole strike alert device wherein said solar cells can be in sheet form pivotally fastened to said housing.

Another object of the present invention is to provide a fishing pole strike alert device wherein said anchor is of a varying length and form that include stake or stave like embodiments serving as ground engaging members.

Additional objects of the present invention will appear as the description proceeds.

The present invention overcomes the shortcomings of the prior art by providing a fishing pole strike alert device having an anchor pivotally connected to a rod holder with spring tensioned members positioned between the anchor and the rod holder. The tensioning members provide means for varying the angular displacement of the rod holder and anchor, which is used in an electrical alarm circuit with alarm contacts actuatable through the angular displacement between the anchor and rod holder with one of said contacts user selectively positionable to vary the pressure required to actuate said alarm circuit. The electrical circuit uses a self-contained DC power source, preferably a battery. The present invention also provides a fishing strike pole alert device wherein said anchor is a stake decreasing diametrically to a point whereby said anchor can be inserted into the ground. The anchor can have a plurality of holes whereby the anchor can alternately be fastened to structure using other user provided fastening means. The rod holder forms housing for the butt of a fishing pole with the housing exterior surface usable as structure for fastening thereto one or more solar cells for charging said DC power source with the solar cells in sheet form pivotally fastened to the housing.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
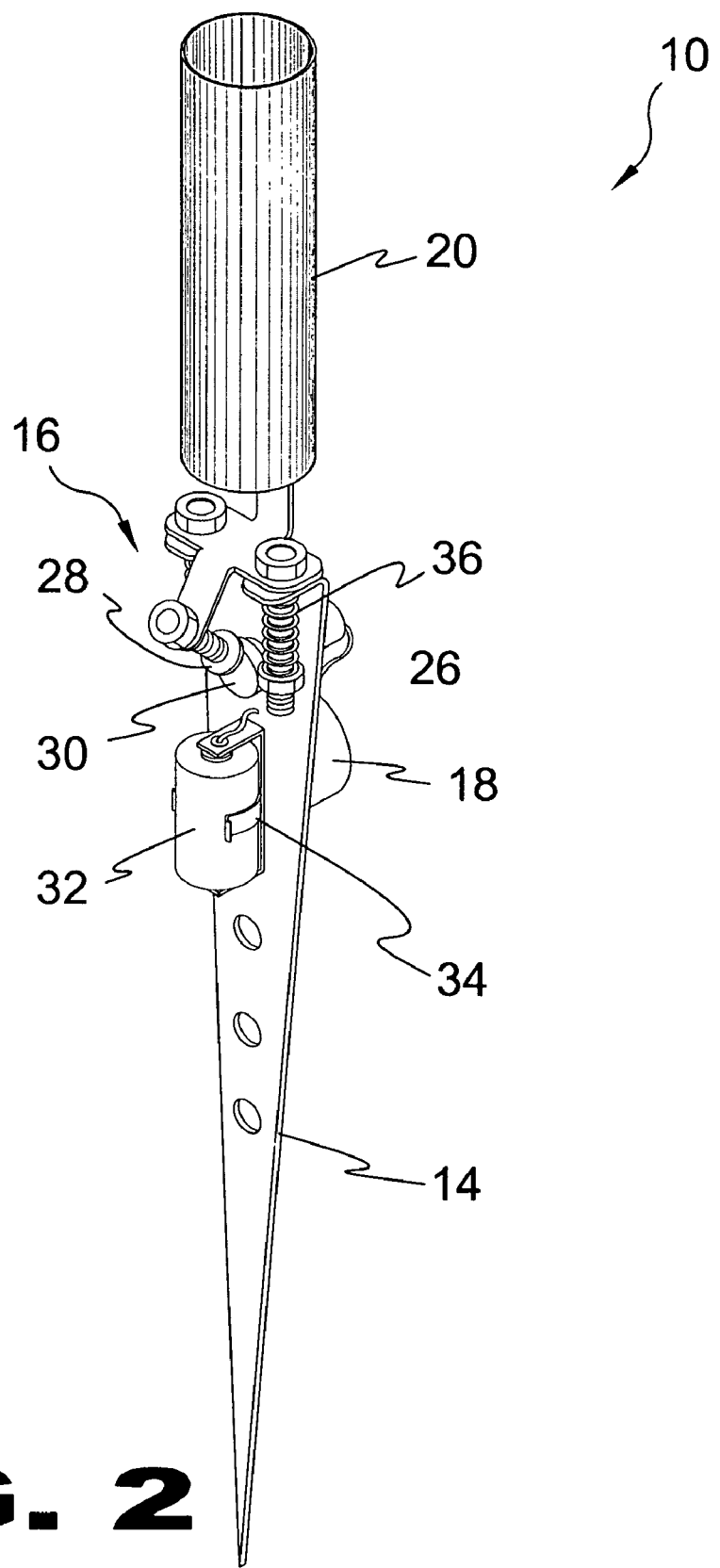
Figure 3:
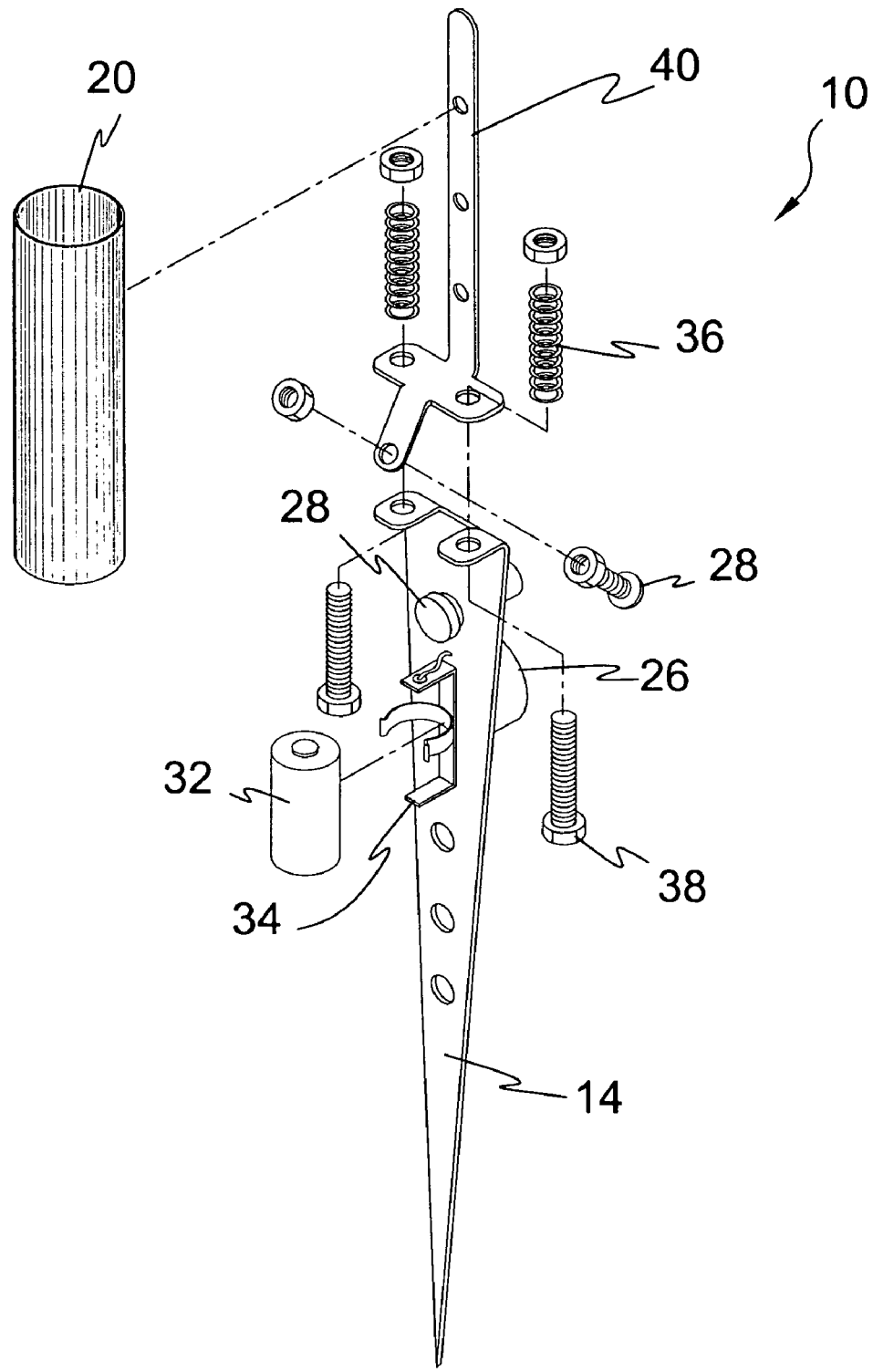
Figure 4:
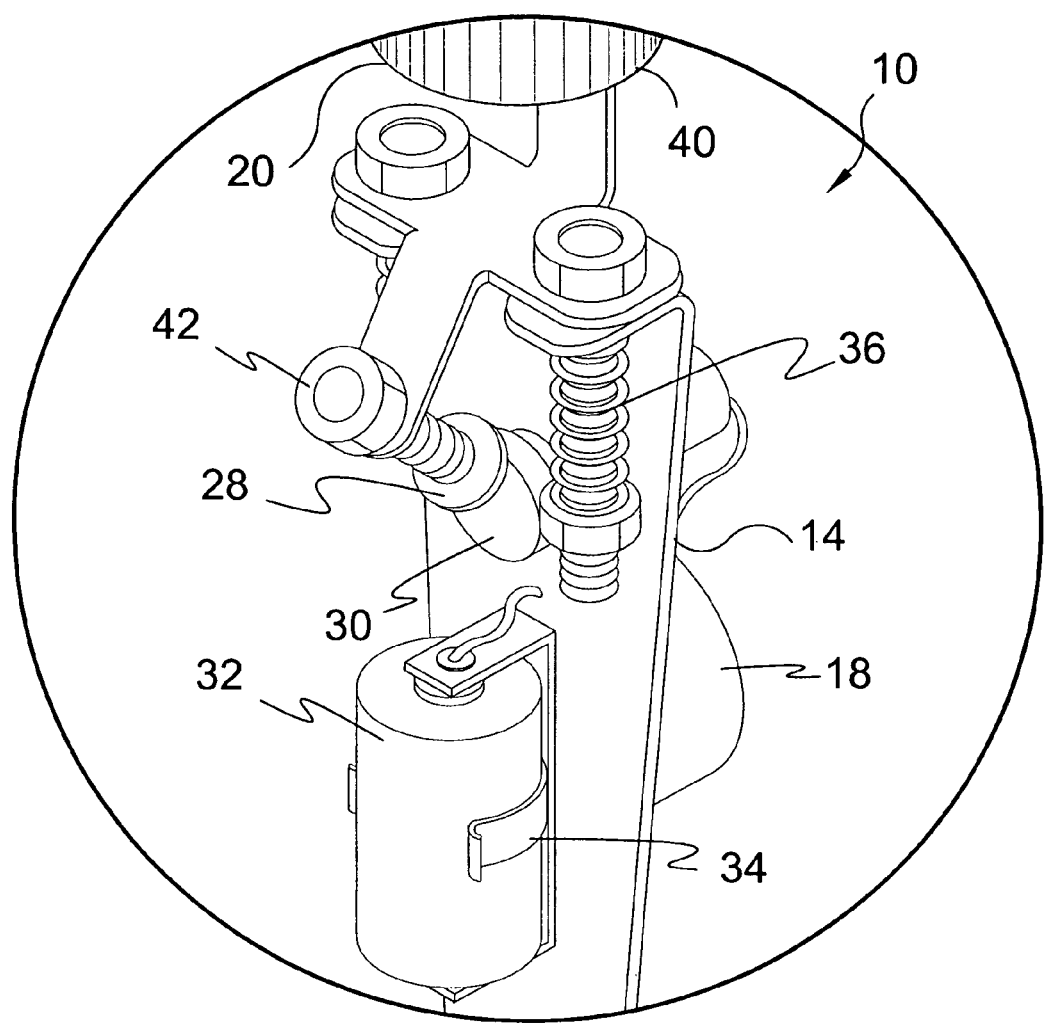
Figure 5:
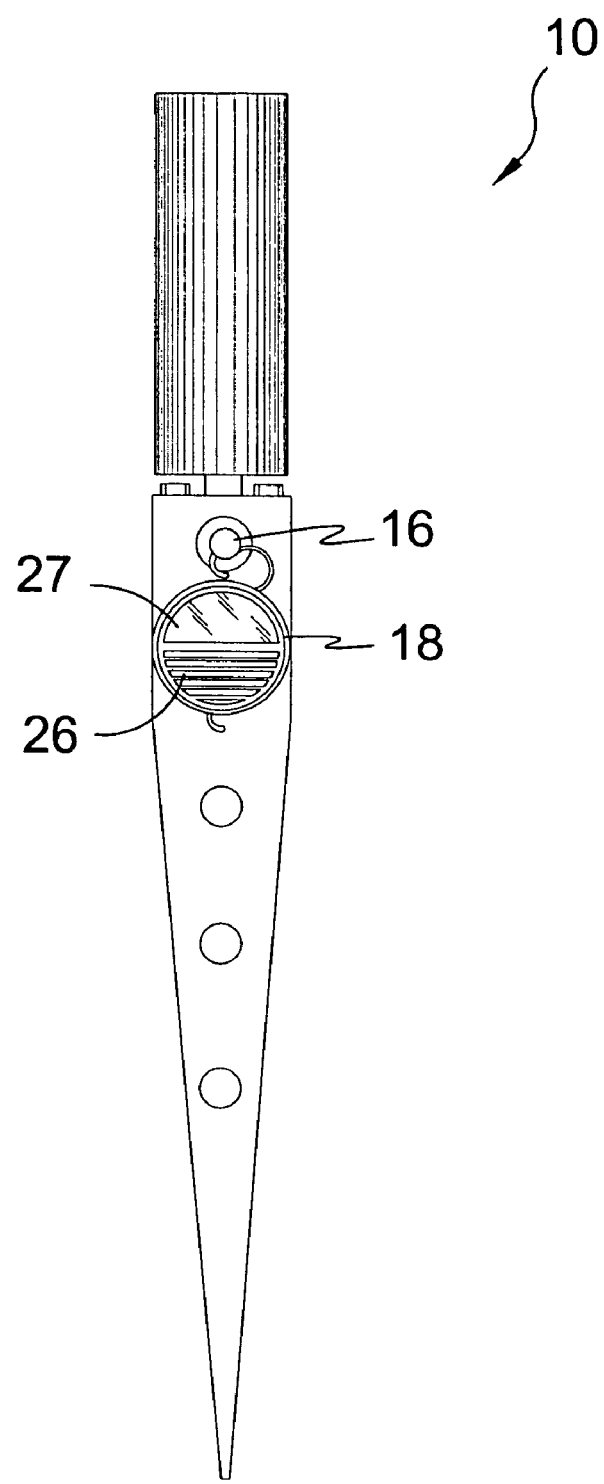
Figure 6:
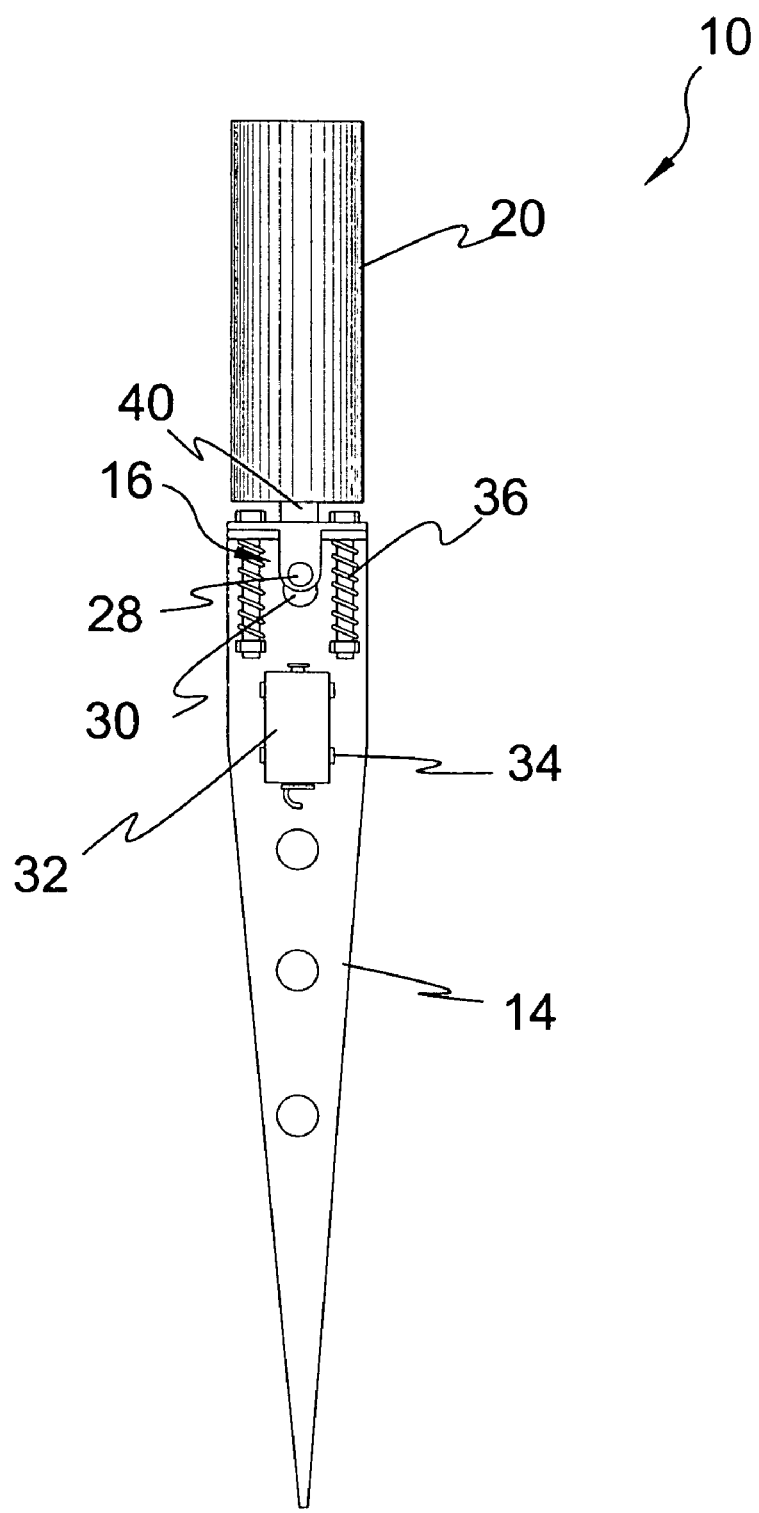
Figure 7:
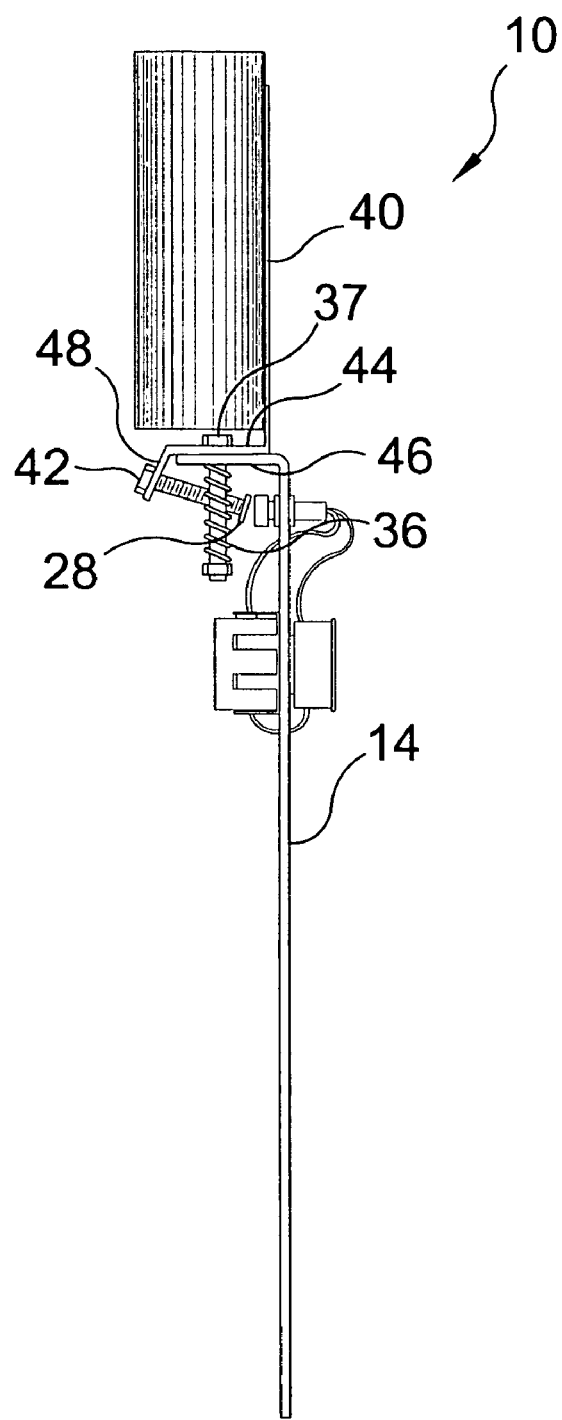
Figure 8:
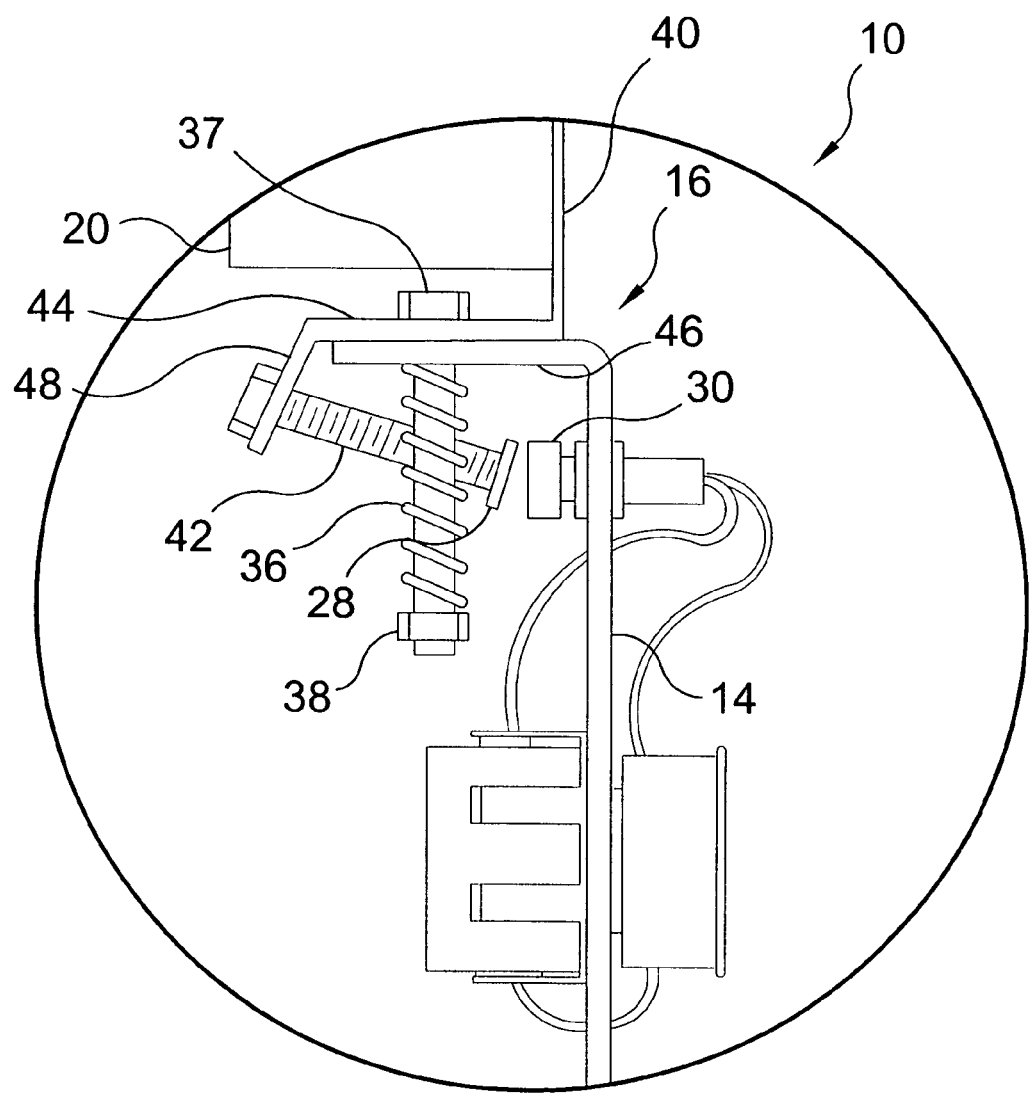
Figure 9:
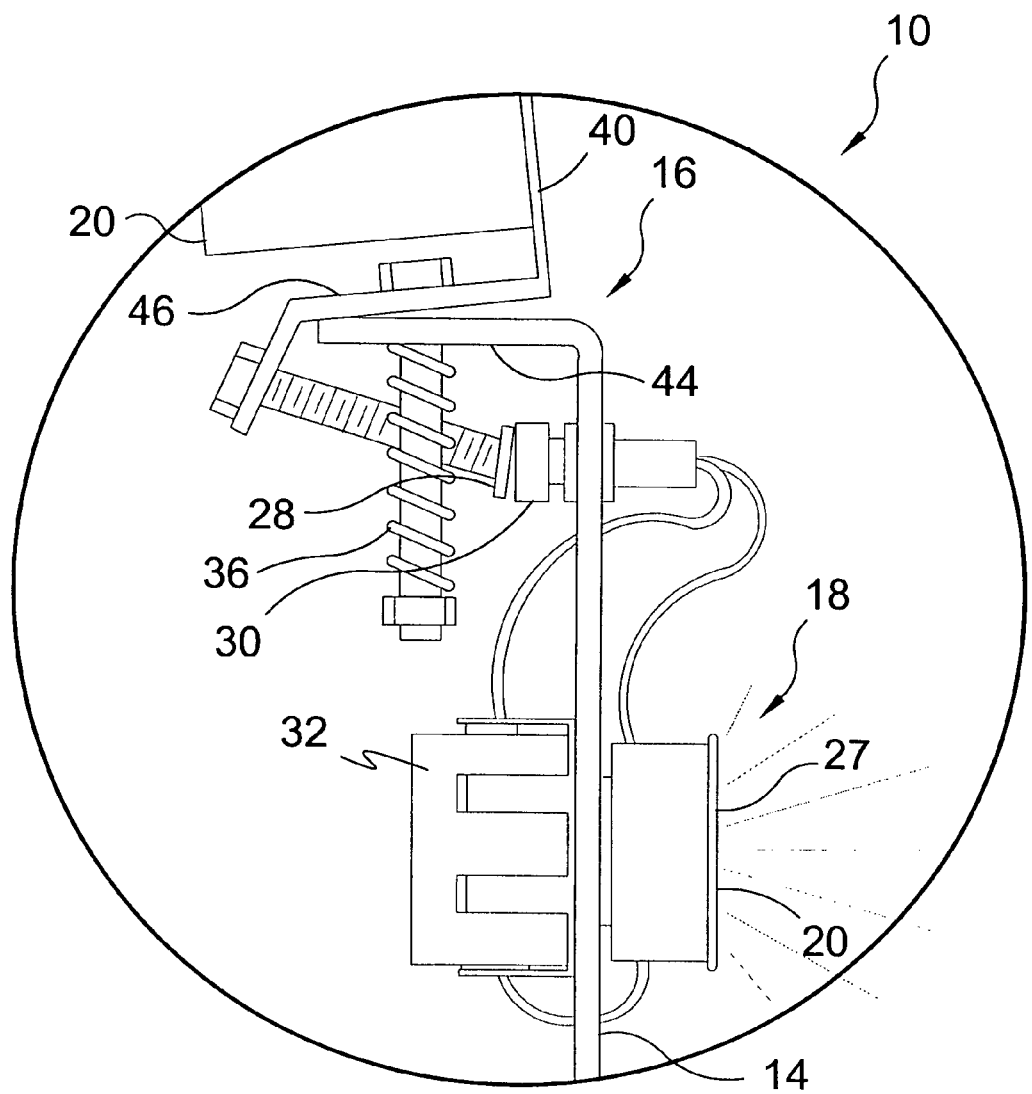
Figure 10:
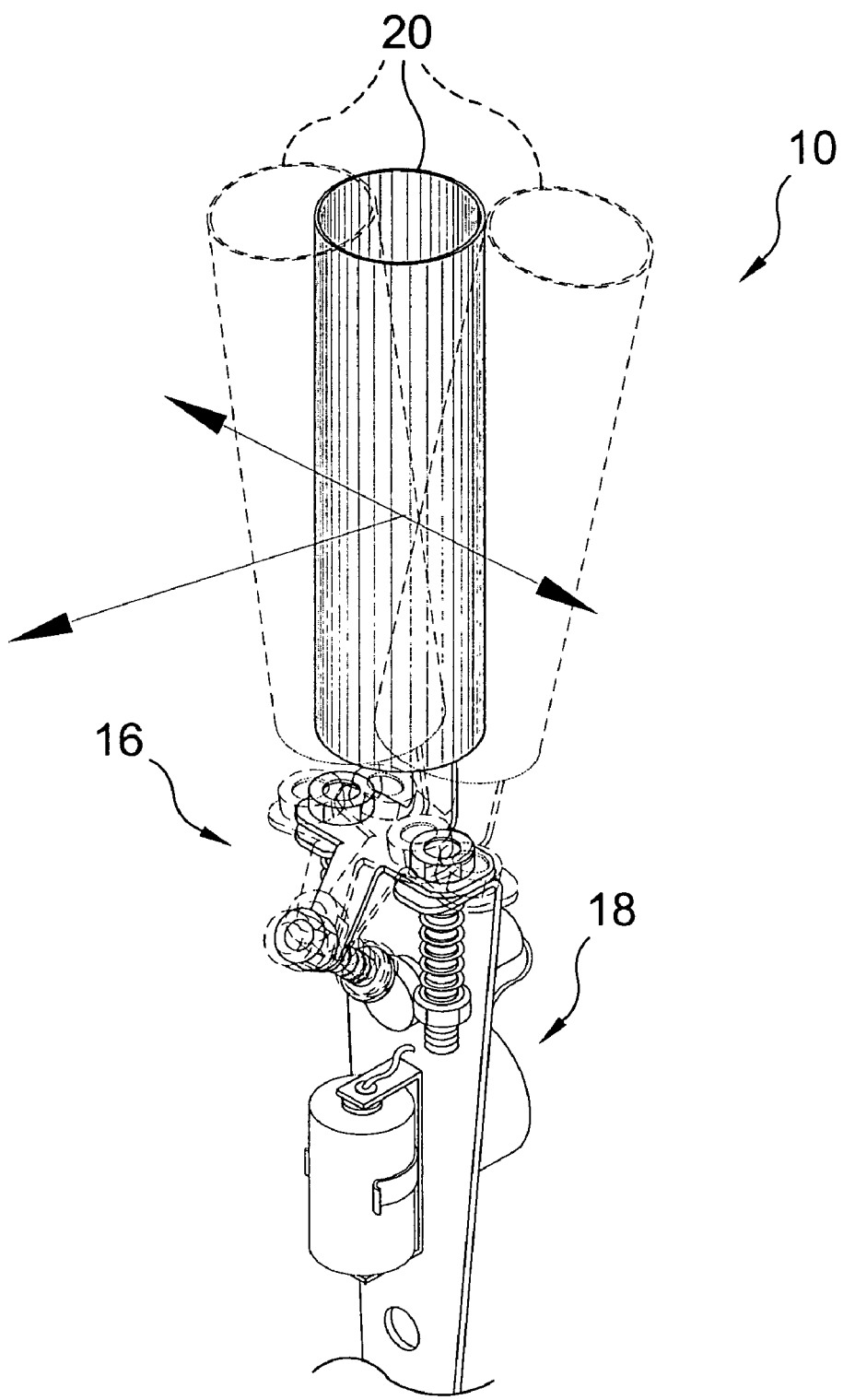
Figure 11:
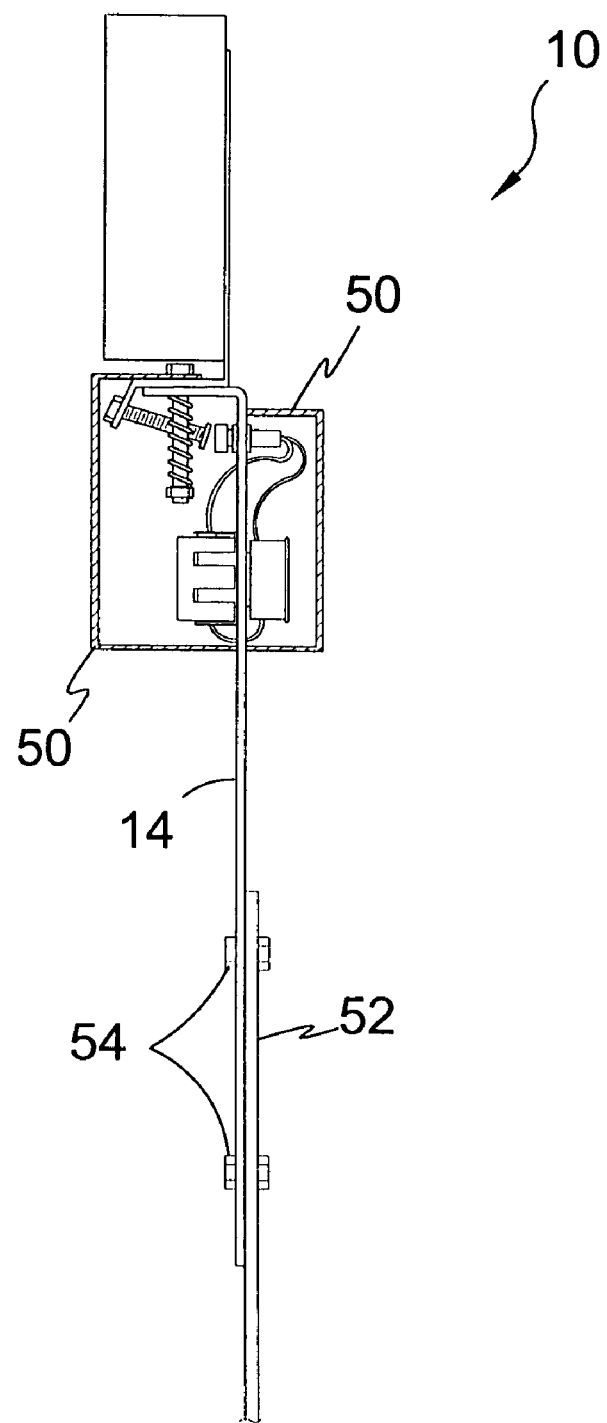
Figure 12:
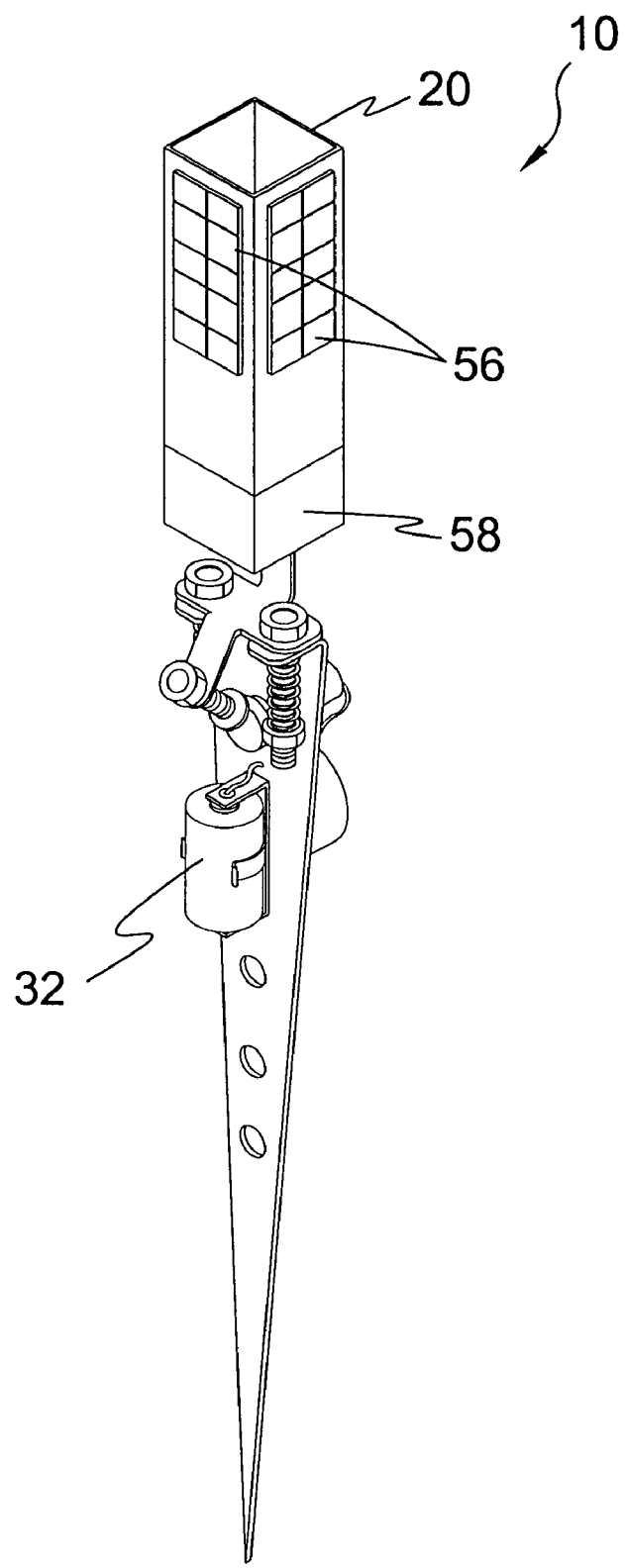
Figure 13:
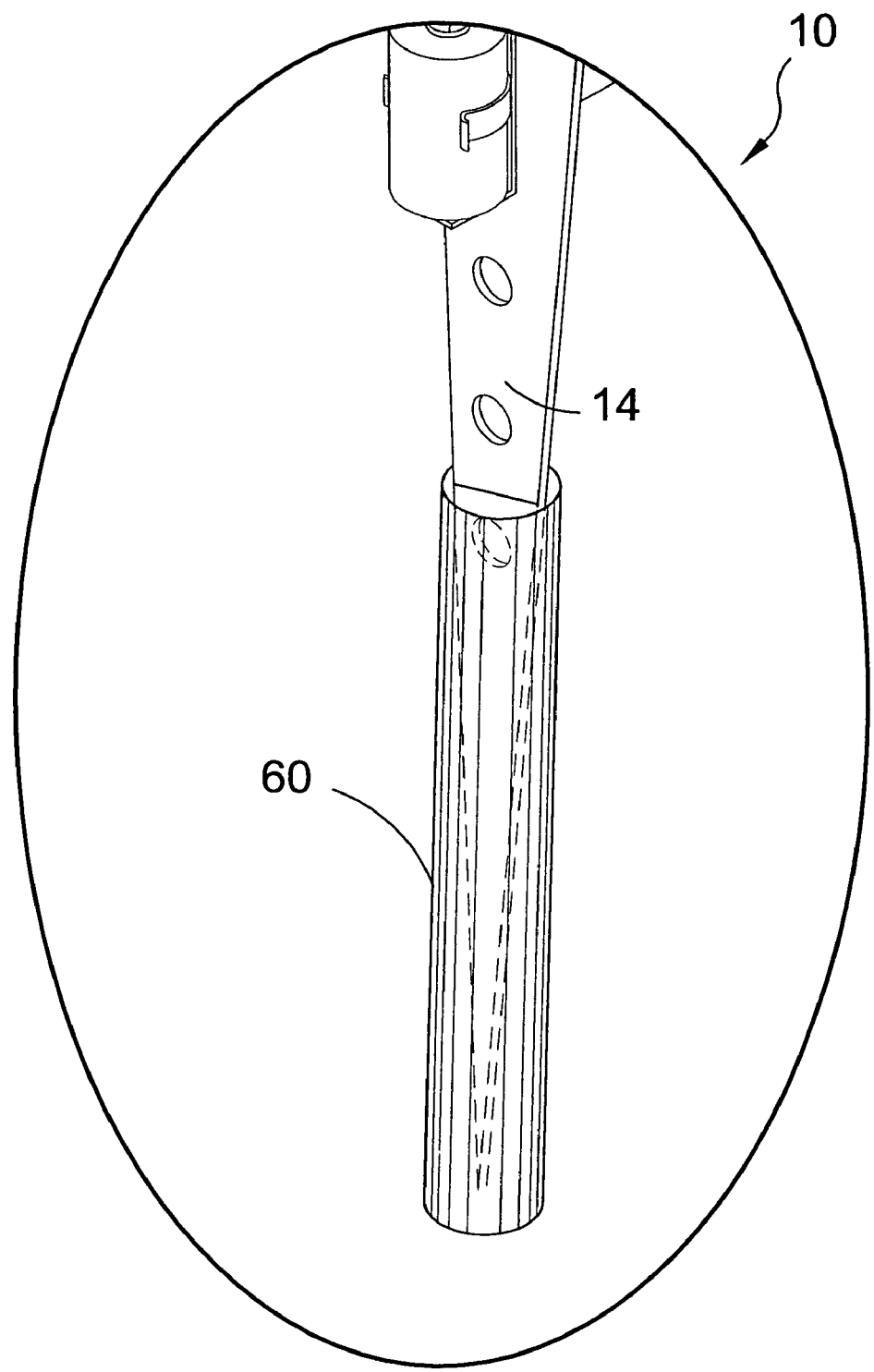

In order that the invention may be more fully understood, it will now be described, by way of example, with reference to the accompanying drawing in which:

FIG. 1 is an illustrative view of the present invention in use;
FIG. 2 is a perspective view of the present invention;
FIG. 3 is an exploded view of the present invention;
FIG. 4 is a detailed view of the present invention;
FIG. 5 is a rear view of the present invention;
FIG. 6 is a front view of the present invention;
FIG. 7 is a side view of the present invention;
FIG. 8 is a detailed view of the contact and switch of the present invention in an open position;
FIG. 9 is a detailed view of the contact and switch of the present invention in an activated position;
FIG. 10 is an illustrative view of the present invention;
FIG. 11 is an alternate view of the present invention having additional elements;
FIG. 12 is an alternate view of the present invention having solar rechargeable capabilities; and
FIG. 13 is a perspective view of an additional element of the present invention.

DESCRIPTION OF THE REFERENCED NUMERALS

Turning now descriptively to the drawings, in which similar reference characters denote similar elements throughout the several views, the figures illustrate the Fishing Pole Strike Alert Apparatus of the present invention. With regard to the reference numerals used, the following numbering is used throughout the various drawing figures.

10 Fishing Pole Strike Alert Apparatus of the present invention
12 fish
14 anchor member
16 alarm engagement switch
18 alarm means
20 rod holder
22 fishing rod
24 fishing line
26 audible alarm
27 visual alarm
28 contact member
30 switch contact
32 battery
34 battery cage
36 strike pressure adjustment spring
37 adjustment bolt
38 adjustment nut
40 rod holder bracket
42 contact member adjustment screw
44 pivot plate of 40
46 base plate of 14
48 contact member mounting plate
50 protective cover
52 extension spike
54 extension fastener
56 solar panel
58 recharge unit
60 abrasive sheath

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is a fishing rod holder 20 having a spike like anchoring member 14 pivotally fastened to the rod holder 20 having a user determinable alarm engagement switch 16 means positioned therebetween. When a fish 12 strikes the line 24 and applies pressure to the rod 22, the rod holder 20 will respond to bias applied thereto and pivot thereby causing contacts on the alarm engagement switch 16 to engage and activate at least one alarm means 18 to alert the user of the activity on the line 24.

FIG. 2 is a perspective view of the present invention 10. The present invention 10 is a fishing rod holder 20 that includes an alarm means 18 such as a audible alarm 26 so that when a fish strikes the line the rod holder 20 will pivot relative to the stationary anchor member 14 thereby causing the contact member 28 to engage the switch contact 30 and close the alarm engagement switch 16 and actuate the audible alarm 26 to alert the user of the strike. Power is supplied to the circuit by a DC battery 32 retained in a battery cage 34 mounted on the anchor member 14. Strike pressure adjustment springs 36 enable the user to determine how great a bias needs to be applied to the rod holder 20 to actuate the alarm means 18.

FIG. 3 is an exploded view of the present invention 10. The present invention 10 is a fishing rod holder 20 that includes an alarm means 18 such as a audible alarm 26 so that when a fish strikes the line the rod holder 20 and the rod holder bracket 40 onto which it is mounted will pivot relative to the stationary anchor member 14 thereby causing the contact member 28 to engage the switch contact 30 and close the alarm engagement switch 16 and actuate the audible alarm 26 to alert the user of the strike. Power is supplied to the circuit by a DC battery 32 retained in a battery cage 34 mounted on the anchor member 14. Strike pressure adjustment springs 36 enable the user to determine how great a bias needs to be applied to the rod holder 20 to actuate the alarm means 18 by tightening or loosening the adjustment nuts 38 on the adjustment bolts 39 accordingly.

FIG. 4 is a detailed view of the present invention 10. Shown is a detailed view of the present invention 10, having a user determinable alarm engagement switch means 16 that includes an alarm means 18 such as a audible alarm 26 so that when a fish strikes the line the rod holder 20 and the rod holder bracket 40 onto which it is mounted will pivot relative to the stationary anchor member 14 thereby causing the contact member 28 to engage the switch contact 30 and close the alarm engagement switch 16 and actuate the audible alarm 26 to alert the user of the strike. A contact member adjustment screw 42 serves to adjust the distance between the contact member 28 and the switch contact 30. Power is supplied to the circuit by a DC battery 32 retained in a battery cage 34 mounted on the anchor member 14. Strike pressure adjustment springs 36 enable the user to determine how great a bias needs to be applied to the rod holder 20 to actuate the alarm means 18.

FIG. 5 is a rear view of the present invention 10. Shown is a rear view of the present invention 10 showing a configuration for the alarm means 18 that includes a combination audible alarm 26 and a visual alarm 27 that are activated when the alarm engagement switch 16 is engaged.

FIG. 6 is a front view of the present invention 10. Shown is a front view of the present invention 10, having a user determinable alarm engagement switch means 16 that includes an alarm means such as a audible alarm 26 so that when a fish strikes the line the rod holder 20 and the rod holder bracket 40 onto which it is mounted will pivot relative to the stationary anchor member 14 thereby causing the contact member 28 to engage the switch contact 30 and close the alarm engagement switch 16 and actuate the audible alarm to alert the user of the strike. Power is supplied to the circuit by a DC battery 32 retained in a battery cage 34 mounted on the anchor member 14. Strike pressure adjustment springs 36 enable the user to determine how great a bias needs to be applied to the rod holder 20 to actuate the alarm means.

FIG. 7 is a side view of the present invention 10. Shown is a side view of the present invention 10 showing the rod holder bracket 40 having a pivot plate 44 seated on a base plate 46 extending perpendicularly from the top of the anchor member 14. The pivot plate 44 is retained against the base plate 46 by the bias presented from the strike pressure adjustment spring 36 and bolt 37. The pivot plate 44 extends perpendicularly from the bottom of the rod holder bracket 40 and projects angularly downward upon passing the distal edge of the base plate 46. The angular projection is the contact member mounting plate 48 onto which the contact member 28 and associated contact member adjustment screw 42 are mounted.

FIG. 8 is a detailed view of the alarm engagement switch 16 of the present invention 10 in an open position showing the rod holder bracket 40 having a pivot plate 44 seated on a base plate 46 extending perpendicularly from the top of the anchor member 14. The pivot plate 44 is retained against the base plate 46 by the bias presented from the strike pressure adjustment spring 36 and bolt 37. That bias can be changed to adjust the responsiveness of the pivoting rod holder 20 by tightening or loosening the adjustment nut 37 accordingly. The pivot plate 44 extends perpendicularly from the bottom of the rod holder bracket 40 and projects angularly downward upon passing the distal edge of the base plate 46. The angular projection is the contact member mounting plate 48 onto which the contact member 28 and associated contact member adjustment screw 42 are mounted.

FIG. 9 is a detailed view of the alarm engagement switch 16 of the present invention 10 in an activated position. Shown is a detailed view of the user determinable alarm engagement switch 16 in an activated position wherein the bias applied to the rod holder 20 overcomes the tension of the strike pressure adjustment spring 36 thereby compressing it as the pivot plate 44 of the rod holder bracket 40 pivots on the base plate 44 of the anchor member 14 and causing the contact member 28 to engage the switch contact 30 thus completing the circuit between the battery 32 and the alarm means 18 and activating the audible 26 and visual 27 alarms.

FIG. 10 is an illustrative view of the present invention 10 demonstrating how the forward or sideways movement of the rod holder 20 will close the alarm engagement switch 16 and activate the alarm means 18.

FIG. 11 is an alternate view of the present invention 10 having additional elements. Shown is an alternate of the present invention 10 having protective covers 50 over the components, the fishing rod holder having a spike-like anchoring member 14 with an attachable extension spike 52 secured thereto with attachment fasteners 54 for use in sand or other places requiring a higher rod position.

FIG. 12 is an alternate view of the present invention 10 having solar rechargeable capabilities. Shown is an alternate view of the present invention 10 having solar panels 56 mounted to the external walls of the rod holder 20. A recharge unit 58 is positioned within the base portion of the rod holder 20 and in communication with the battery 32.

FIG. 13 is a perspective view of an additional element of the present invention 10. Shown is the present invention 10 having an abrasive sheath 60 that is of substantially the size of the aperture presented by a standard fishing pole holder that is fitted over the ground spike 14 to allow the user to use existing pole mounting means along with the benefits provided by the present invention 10.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

The invention claimed is:

1. A fishing rod strike alert for retaining a fishing rod during use and alerting the user of activity on the line comprising:
   a) a substantially flat anchor member tapering to a point at a bottom portion thereof and including a base plate with a pair of recesses extending perpendicularly from a top portion;
   b) a rod holder bracket in liner alignment with said anchor member supporting a fishing rod holder and having a pivot plate extending perpendicularly from a bottom of said rod holder bracket for a length of said base plate with a contact member mounting plate extending angularly downward from a distal end thereof, said pivot plate further including a pair of recesses in alignment with said recesses of said base plate, said pivot plate being pivotal about said distal end of said pivot plate, said fishing rod holder attached to said rod holder bracket directly above said pivot plate;
   c) a first electrical contact mounted on said flat anchor member under said base plate between said recesses;
   d) an adjustment screw threaded through said contact mounting plate having a second electrical contact on a distal end thereof spaced from said first electrical contact whereby when said rod holder bracket pivots said contacts come into contact each other after a pre-determined distance of travel of said second electrical contact;
   e) an alarm system for activating an alarm when said first and second contacts come into contact with each other, an adjustment by a user of said adjustment screw changing the distance said second contact must travel and said rod holder must pivot to set off said alarm; and
   f) a bolt extending through each said pair of mating recesses on said pivot plate and said base plate having a head above said pivot plate and a nut on said bolt below said base plate, a tension spring disposed on each said bolt between said base plate and said nut, whereby a bias required to pivot said rod holder on said anchor member is adjusted by tightening said nuts to compress said springs to require a greater bias and loosening said nuts to require a lesser bias whereby ad user can adjust both to set how much bias needs to be applied to said rod holder for said rod holder to move and the adjustment screw for the distance said rod holder must move to actuate said alarm.

2. A fishing rod strike alert for retaining a fishing rod during use and alerting the user of activity on the line comprising:
   a) a substantially flat anchor member tapering to a point at a bottom portion thereof and including a base plate with a pair of recesses extending perpendicularly from a top portion;
   b) a rod holder bracket in linear alignment with said anchor member having a pivot plate extending perpendicularly from a bottom thereof for the length of said base plate with a contact member mounting plate extending angularly downward from a distal end thereof, said pivot plate further including a pair of recesses in alignment with said recesses of said base plate;
   c) a strike pressure adjustment means for pivotally securing said rod holder bracket to said anchor member;
   d) a fishing rod holder mounting on said rod holder bracket;
   e) means comprising an alarm engagement switch and related circuitry for alerting a user when said rod holder bracket has pivoted a pre-determined distance on said anchor member; and
   f) said alarm engagement switch means comprising a battery, a first electrical contact mounted on said anchor member proximal said base plate an in electrical communication with said battery, an alarm in electrical communication with said first electrical contact said battery, and an adjustment screw threaded through said contact mounting plate having a second electrical contact on a distal end thereof spaced from said first electrical contact whereby once said rod holder bracket pivots said predetermined distance for said contacts to come into contact with each other, an electrical circuit is closed, activating said alarm, said adjustment screw being adjustable by a user to adjust said predetermined distance said second contact must travel and said rod holder must pivot to set off the alarm and whereby a use can use said strike pressure adjustment means to set how much bias needs to be applied to said rod holder for said rod holder to move and actuate said alarm;
   wherein said strike pressure adjustment means comprises
      a) a bolt extending through each said pair of mating recesses on said pivot plate and said base plate,
      b) a tension spring disposed on each said bolt; and
      c) a nut disposed on the end of each said bolt sandwiching each said spring between its respective nut and said base plate, whereby the bias required to act upon said rod holder to cause said rod holder bracket to pivot on said anchor member may be adjusted by tightening said nuts to compress said springs to require a greater bias and loosening said nuts to require a lesser bias.

3. The fishing rod strike alert as recited in claim 2, wherein said alarm is an audible alarm.

4. The fishing rod strike alert as recited in claim 2, wherein said alarm is a visual alarm.

5. The fishing rod strike alert as recited in claim 2, wherein said alarm includes a visual and an audible alarm.

6. The fishing rod strike alert as recited in claim 2, wherein said alarm engagement switch has a protective cover to prevent the components from the elements.

7. The fishing rod strike alert as recited in claim 2, further including an anchor member extension means comprising a plurality of recesses disposed in said anchor member and an extension spike having a plurality of recesses corresponding with those in said extension means wherein said extension spike is fastened thereto with fastener elements extending through said recesses.

8. The fishing rod strike alert as recited in claim 2, wherein said battery is rechargeable.

9. The fishing rod strike alert as recited in claim 8, further including solar rechargeable capabilities comprising:
   a) a plurality of solar panels disposed on said rod holder; and
   b) a recharge unit in electrical communication with said solar panels and said rechargeable batteries.

10. The fishing rod strike alert as recited in claim 2, further including an abrasive outer sheath to retain said anchor member therein and sized for insertion into a standard fishing rod holder.

* * * * *